(12) United States Patent
Huang et al.

(10) Patent No.: US 11,945,528 B2
(45) Date of Patent: Apr. 2, 2024

(54) HIP JOINT MECHANISM AND HUMANOID ROBOT

(71) Applicant: UBTECH ROBOTICS CORP LTD, Shenzhen (CN)

(72) Inventors: Liang Huang, Shenzhen (CN); Hongyu Ding, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 633 days.

(21) Appl. No.: 17/134,147

(22) Filed: Dec. 24, 2020

(65) Prior Publication Data

US 2021/0197908 A1 Jul. 1, 2021

(30) Foreign Application Priority Data

Dec. 30, 2019 (CN) .......................... 201911397803.4

(51) Int. Cl.
*B25J 9/02* (2006.01)
*B62D 57/032* (2006.01)

(52) U.S. Cl.
CPC .................................. *B62D 57/032* (2013.01)

(58) Field of Classification Search
CPC ............................. B25J 9/0006; B62D 57/032
See application file for complete search history.

(56) References Cited

U.S. PATENT DOCUMENTS

2004/0133307 A1* 7/2004 Lee ...................... B62D 57/032
700/245

FOREIGN PATENT DOCUMENTS

| CN | 1317400 A | 10/2001 |
| CN | 1351923 A | 6/2002 |
| CN | 107187512 A | 9/2017 |

\* cited by examiner

*Primary Examiner* — Randell J Krug

(57) ABSTRACT

A hip joint mechanism includes: a hip joint frame; an upper leg movably connected to the hip joint frame; a hip actuator configured to drive the hip joint frame to rotate; two upper leg actuators mounted on the hip joint frame; two transmission mechanisms configured to transmit motion from the two upper leg actuators to the upper leg, wherein each of the upper leg actuators comprises a casing connected to the hip joint frame, and an output shaft connected to one corresponding transmission mechanism, each of the two transmission mechanisms comprises an output end; and three connecting mechanisms, wherein the output ends and the hip joint frame are movably connected to the upper leg through the three connecting mechanisms, the three connecting mechanisms are arranged at three vertices of a triangle.

16 Claims, 15 Drawing Sheets

HIP JOINT MECHANISM AND HUMANOID ROBOT

CROSS REFERENCE TO RELATED APPLICATIONS

This application claims priority to Chinese Patent Application No. CN201911397803.4, filed Dec. 30, 2019, which is hereby incorporated by reference herein as if set forth in its entirety.

BACKGROUND

1. Technical Field

The present disclosure generally relates to robots, and particularly to a hip joint mechanism and a humanoid robot.

2. Description of Related Art

For humanoid robots, reducing the inertia of the legs is of great help to the control of the robot, and reducing the inertia can also reduce the torque required by the robot. However, many humanoid robots adopt a serial hip joint structure, which causes the hip joint structure to be heavy and have a large moment of inertia.

Therefore, there is a need to provide a hip joint mechanism and a robot to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
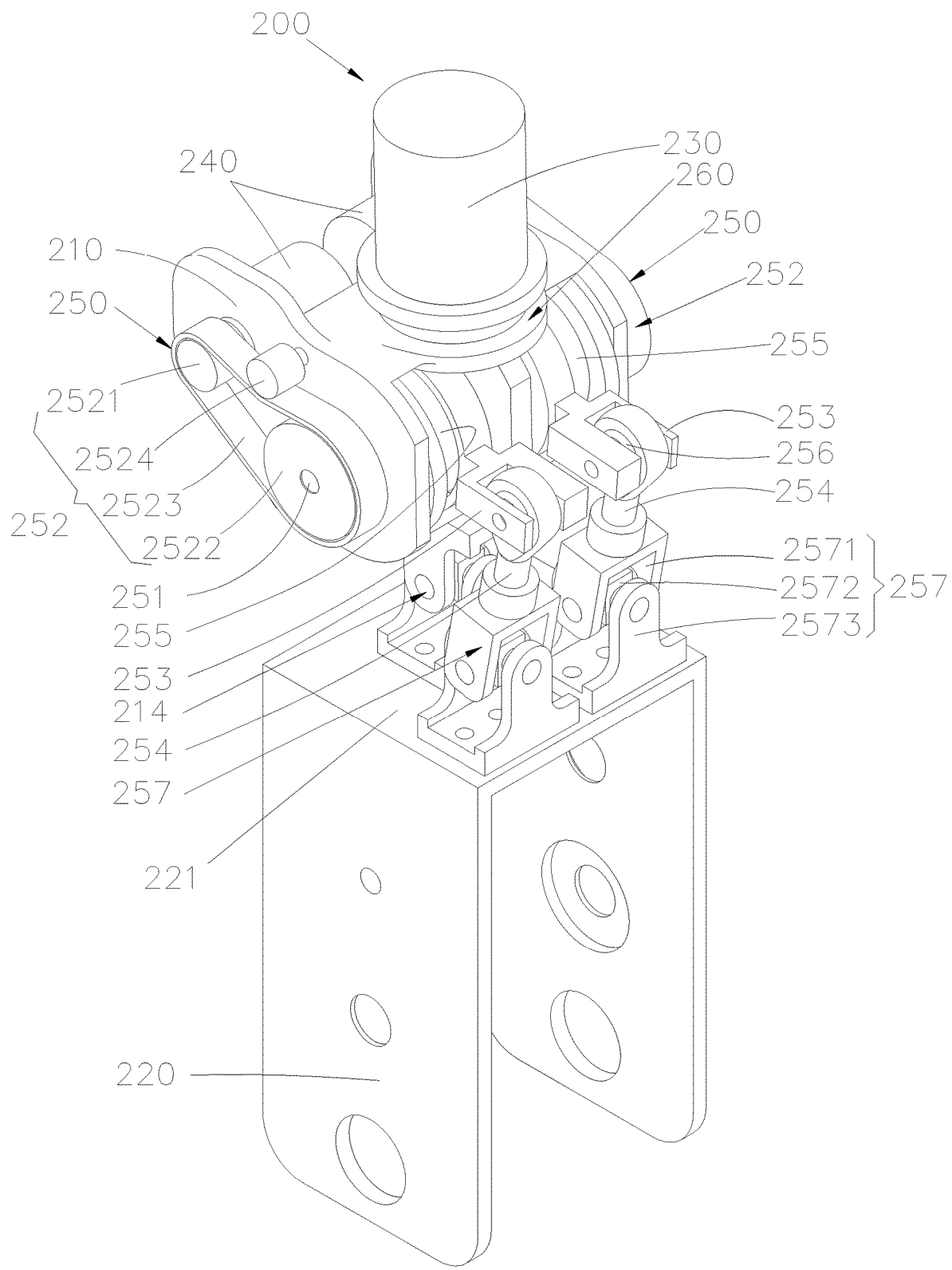
FIG. 1 is an isometric view of a hip joint mechanism according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
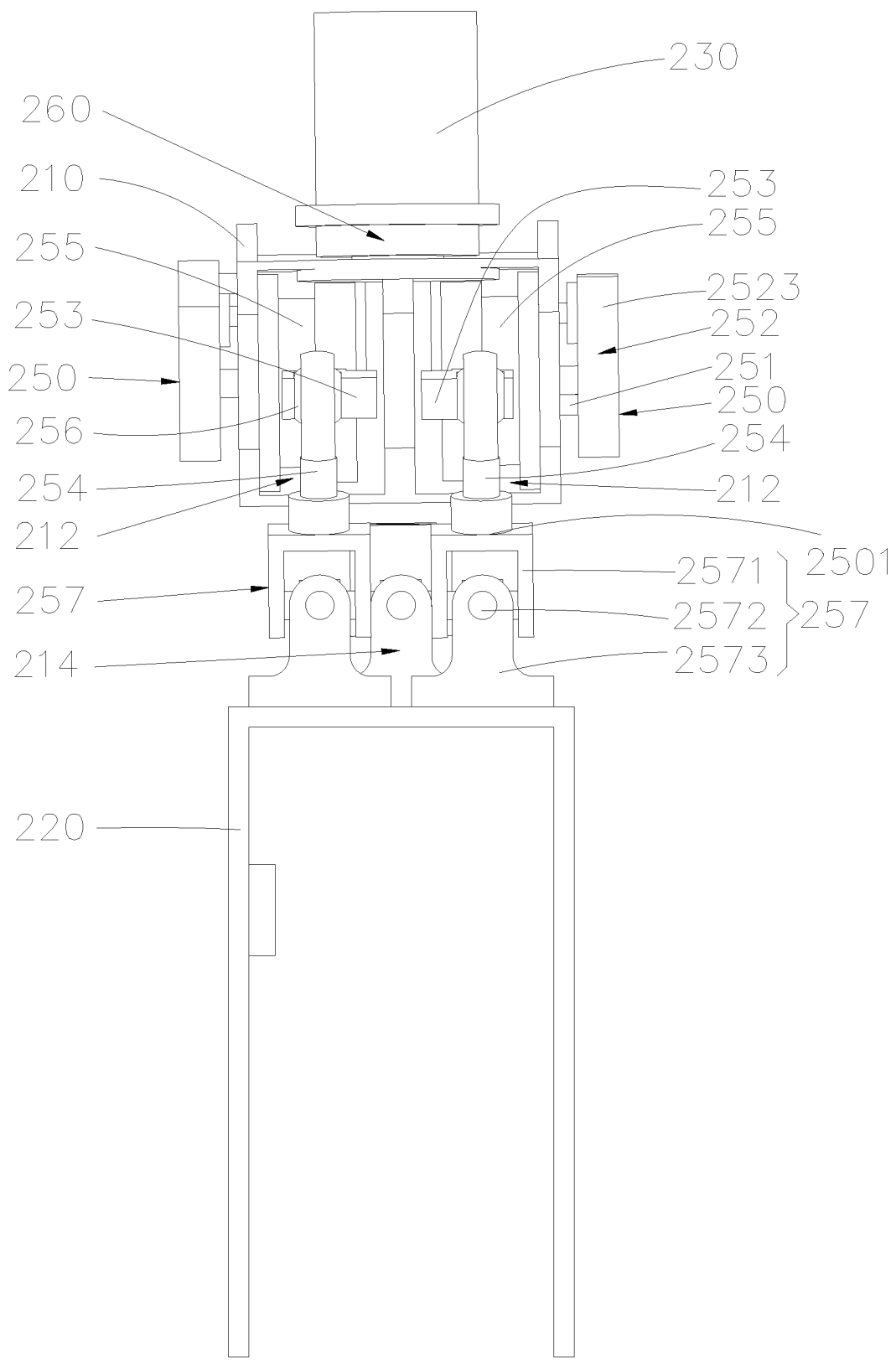
FIG. 2 is a front view of the hip joint mechanism of FIG. 1.
Figure 15:
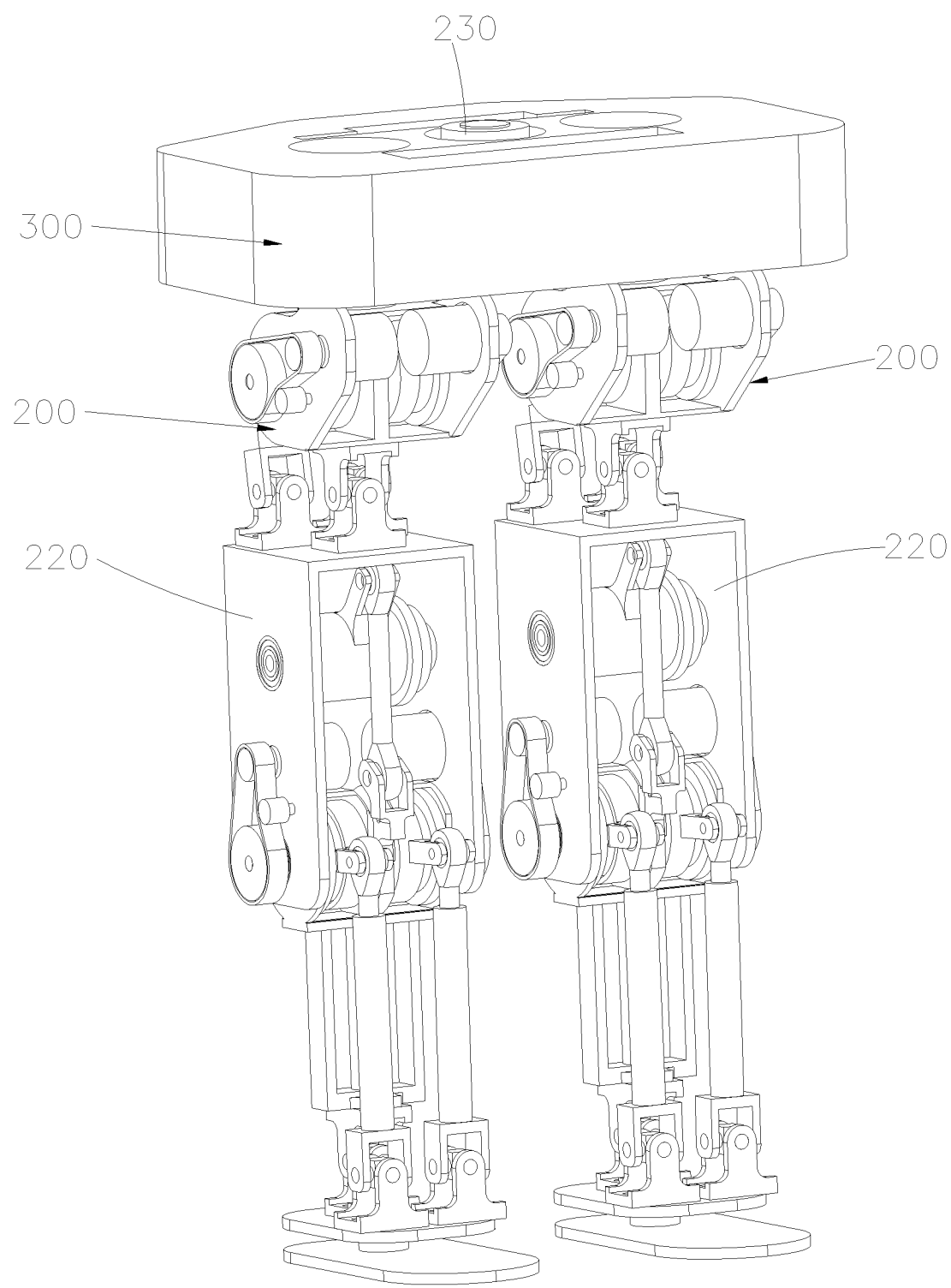
FIG. 15 is an isometric view showing two leg mechanisms of FIG. 14 connected to a waist of a robot.

Referring to FIGS. 1, 2 and 15, in one embodiment, a hip joint mechanism 200 that can be applied in a humanoid robot includes a hip joint frame 210, an upper leg 220, a hip actuator 230, at least one upper leg actuator 240, and at least one transmission mechanism 250. The upper leg 220 is movably connected to the hip joint frame 210. The hip actuator 230 is configured to drive the hip joint frame 210 to rotate, and can be mounted to a waist 300 of the robot. The at least one upper leg actuator 240 is connected to the hip joint frame 210. The at least one transmission mechanism 250 is configured to transmit mechanical power from the at least one hip actuator 240 to the upper leg 220 to move the upper leg 220.

Compared with some conventional hip joint mechanisms, the heavy hip actuator 230 and the at least one upper leg actuator 240 are mounted to the hip joint frame 210. The hip joint frame 210 is driven to rotate by the hip actuator 230. The at least one transmission mechanism 250 transmits the mechanical power from the hip at least one upper leg actuator 240 to the upper leg 220 to move the upper leg 220, which reduces the weight and moment of inertia of the overall structure, raises the center of gravity of the robot, and reduces the mechanical power required by the hip joint.

Referring to FIGS. 1 and 2, in one embodiment, the at least one upper leg actuator 240 is located on the upper portion of the hip joint frame 210, which further reduces the moment of inertia of the hip joint mechanism 200, and reduces the mechanical power required by the hip joint. The hip actuator 230 is arranged outside the hip joint frame 210. In one embodiment, the hip actuator 230 is arranged on the top of the hip joint frame 210. The hip actuator 230 drives the hip joint frame 210 to rotate about a vertical axis of rotation. Such an arrangement reduces the width of the entire structure, reduces the required space, and makes the structure compact.

Figure 10:
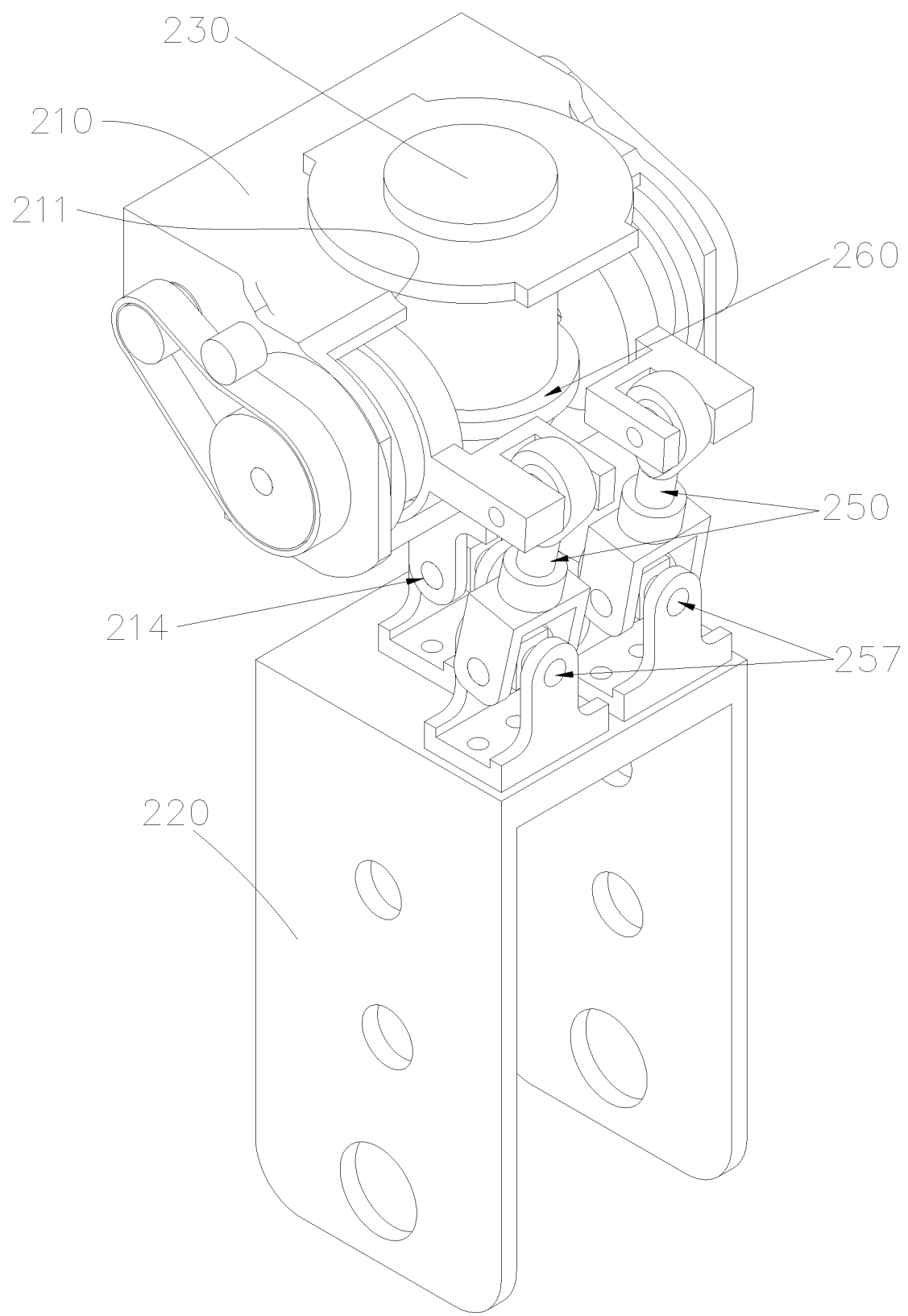
FIG. 10 is an isometric view of a hip joint mechanism according to another embodiment.
Figure 11:
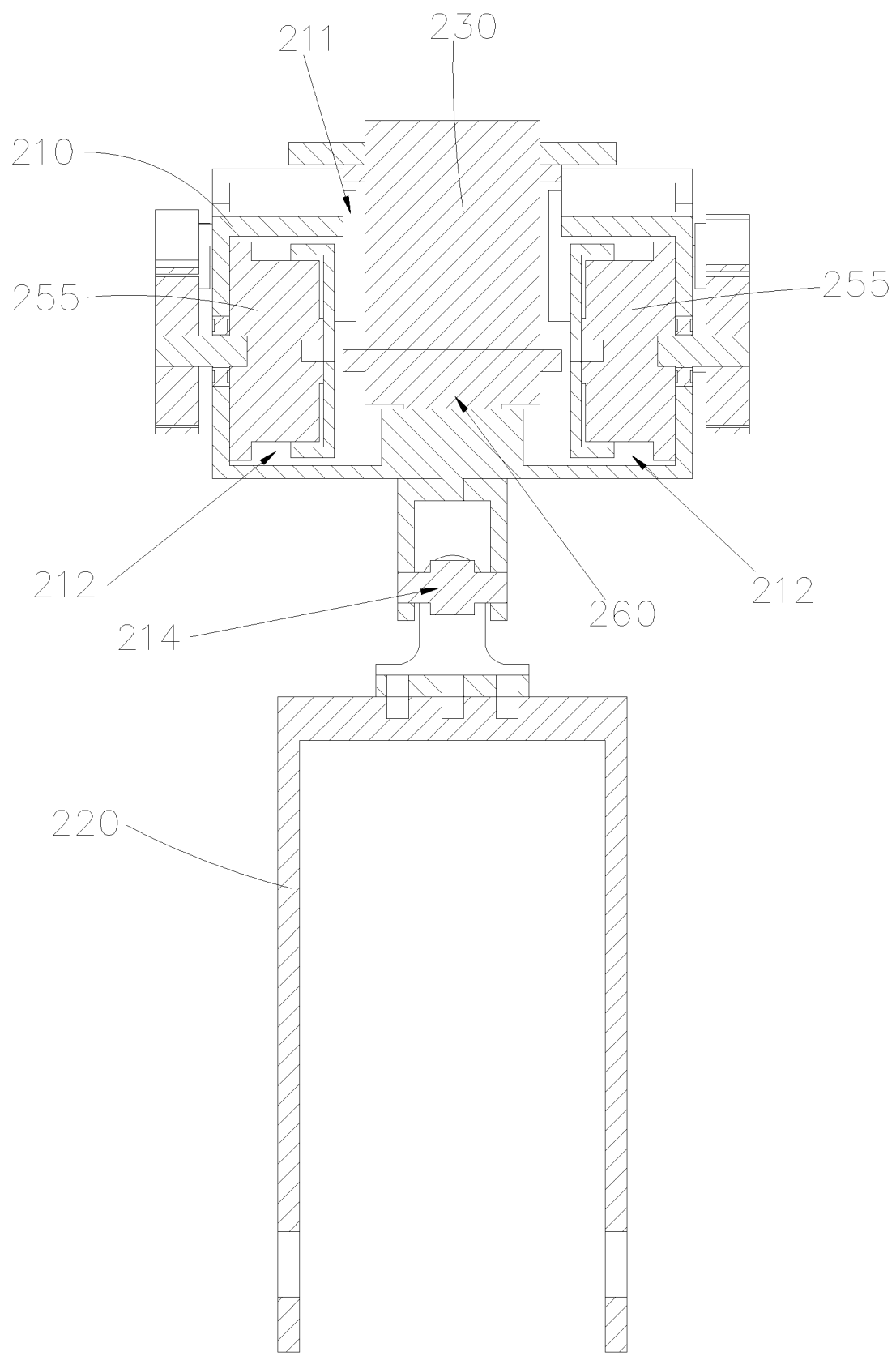
FIG. 11 is cross-sectional view of the hip joint mechanism of FIG. 10.
Figure 12:
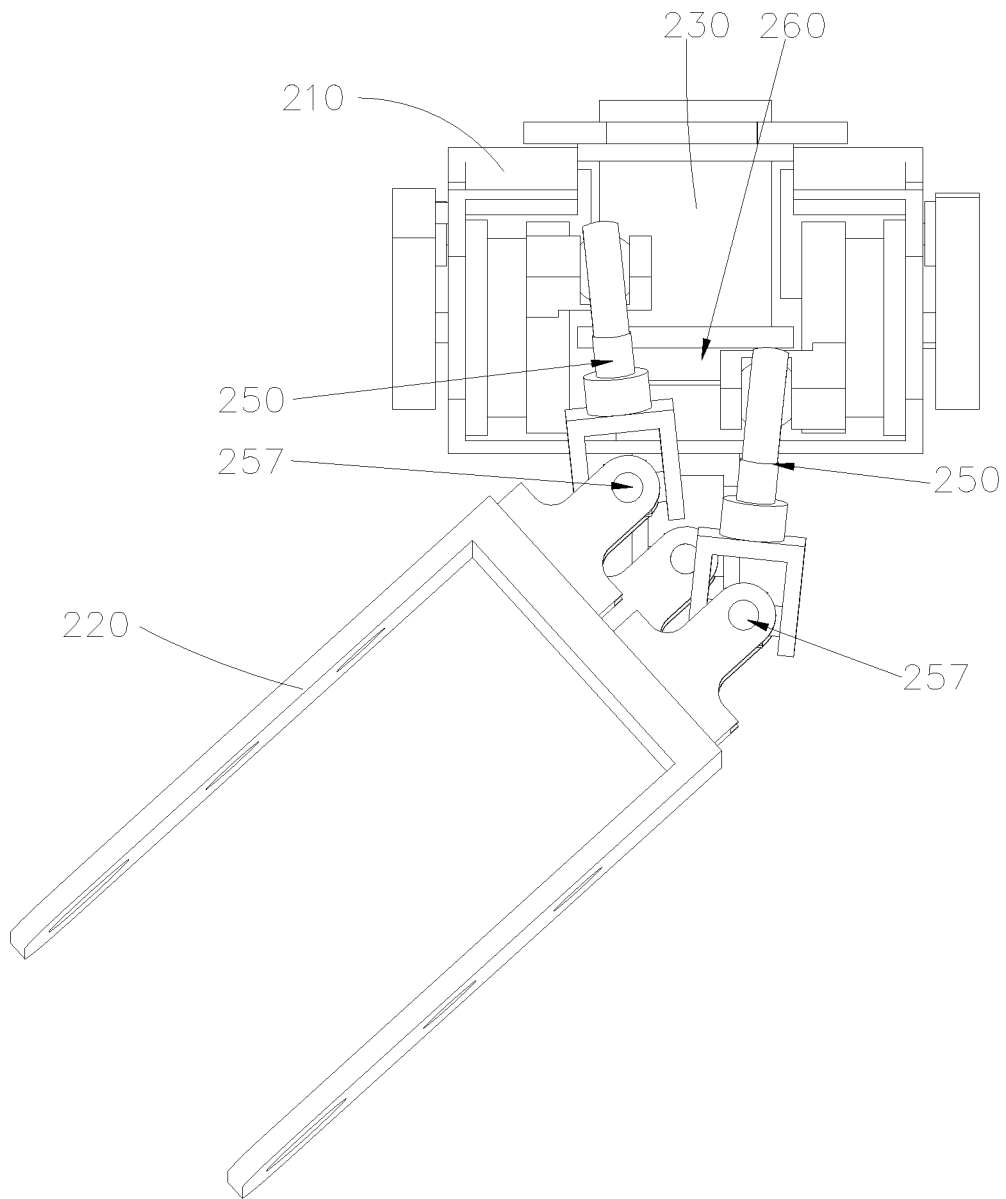
FIG. 12 is a front view of the hip joint mechanism of FIG. 10, showing the upper leg rotating back/forth while performing abduction movement.

Referring to FIGS. 10-12, in one embodiment, the hip actuator 230 is arranged with in the hip joint frame 210. The hip joint frame 210 defines an opening 211 communicating with its inner chamber, so that the hip actuator 230 can be inserted into the inner chamber through the opening 211. Such an arrangement reduces the height of the entire structure, reduces the required space, and makes the structure compact.

Referring to FIGS. 1 and 2, in one embodiment, the hip actuator 230 is a rotating actuator such as a rotating motor and includes an output shaft 2301. A speed reducer 260 an input shaft 2601 connected to the output shaft 2301 of the hip actuator 230, and an output shaft 2602 fixed to the hip joint frame 210. The speed reducer 260 can reduce the rotation speed to increase the output torque to control the rotation of the hip joint frame 210. The speed reducer 260 can be a synchronous belt mechanism, a harmonic reducer, an RV reducer, a planetary reducer, and the like.

Figure 13:
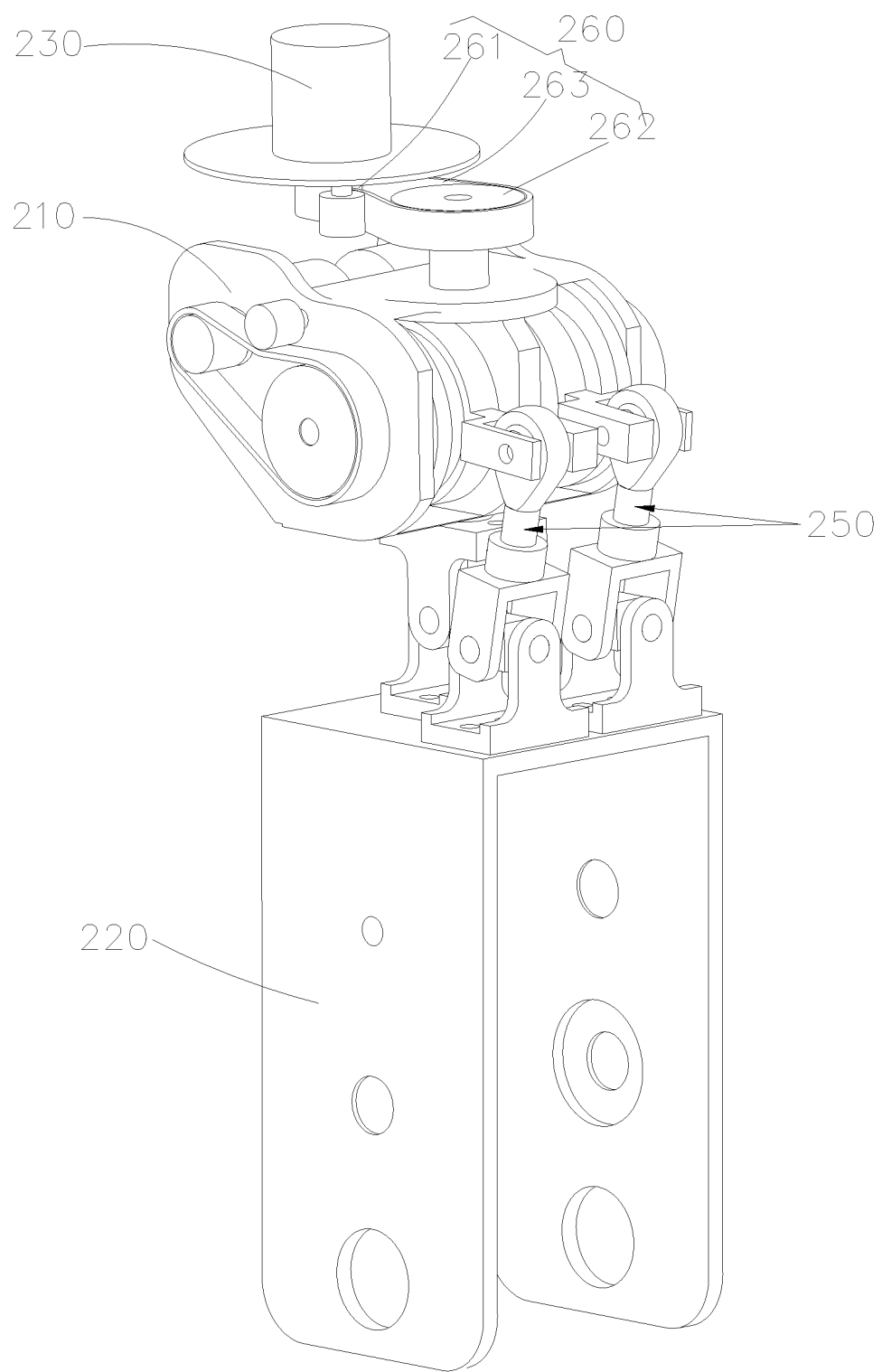
FIG. 13 is an isometric view of a hip joint mechanism according to another embodiment.

Referring to FIG. 13, in one embodiment, the speed reducer 260 is a belt mechanism and includes a first wheel 261 that is driven by the hip actuator 230, a second wheel 262 spaced apart from the first wheel 261 and configured to drive the hip joint frame 210 to rotate, and a belt 263 arranged around the first wheel 261 and the second wheel 262. In this way, the hip actuator 230 is arranged at a certain distance from the rotation axis of the hip joint frame 210, and a space is formed directly above the hip joint frame 210 to install other structural components.

Referring to FIGS. 1 and 2, in one embodiment, the number of the at least one upper leg actuator 240 is two, and the number of the at least one transmission mechanism 250 is two. Each of the upper leg actuators 240 includes a casing 2401 (see FIG. 5) connected to the hip joint frame 210, and an output shaft 2402 (see FIG. 4) connected to one corresponding transmission mechanism 250. Each of the two transmission mechanisms 250 includes an output end 2501. The output ends 2501 and the hip joint frame 210 are movably connected to the upper leg 220 through three connecting mechanisms 257 and 214 (see FIG. 10). The three connecting mechanisms are arranged at three vertices of a triangle, forming a parallel-structure hip joint, which can realize the pitching movement and the rolling movement of the hip joint. Since the three connecting mechanisms are located at three vertices of a triangle, the weight of the robot is transmitted via the hip joint frame 210 and the transmission mechanisms 250 to the upper leg 220, ensuring the stability of the hip joint frame relative to the upper leg 220 when the robot stands on a support surface (e.g., floor, ground, etc.).

Figure 3:
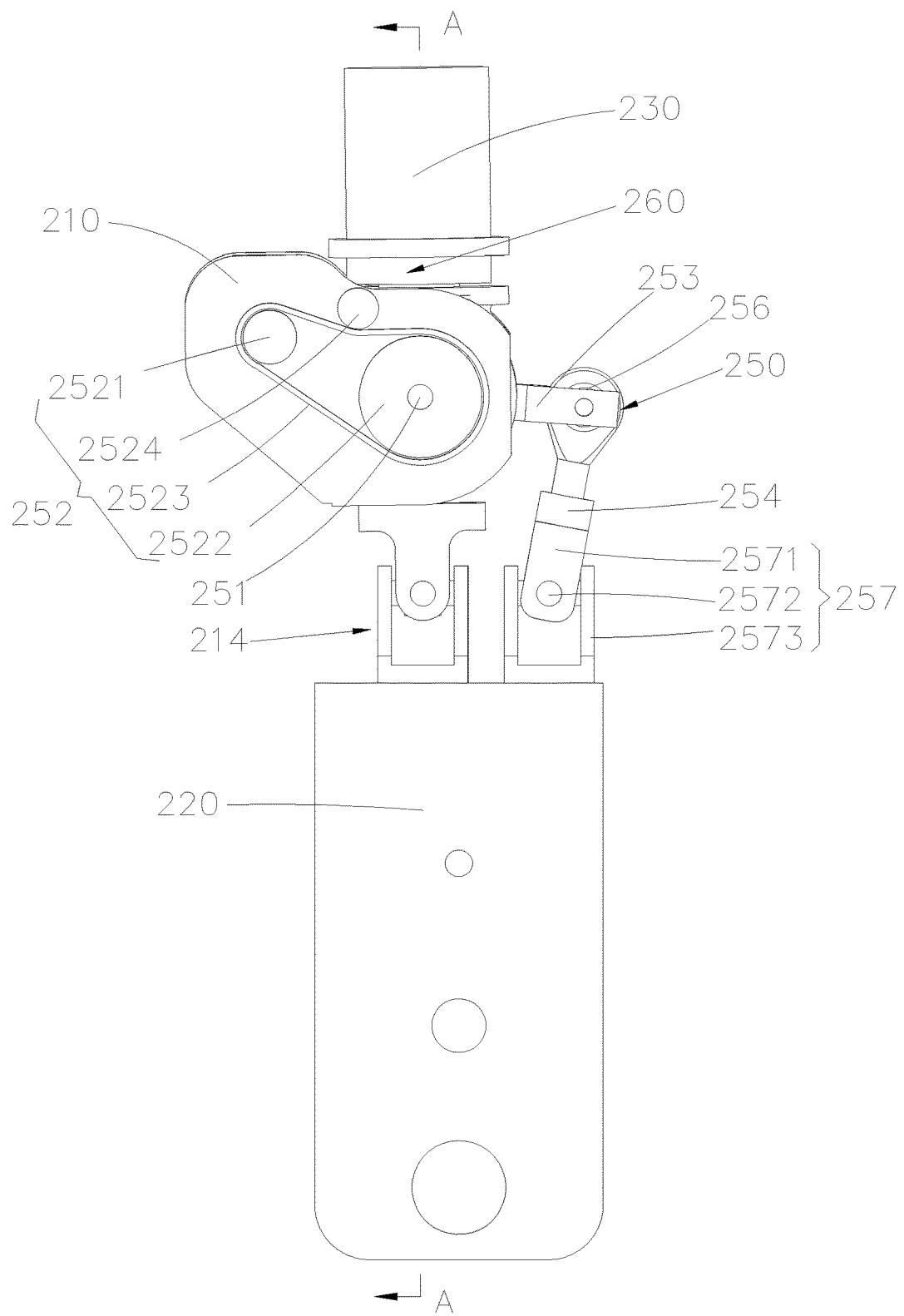
FIG. 3 is a side view of the hip joint mechanism of FIG. 1.
Figure 7:
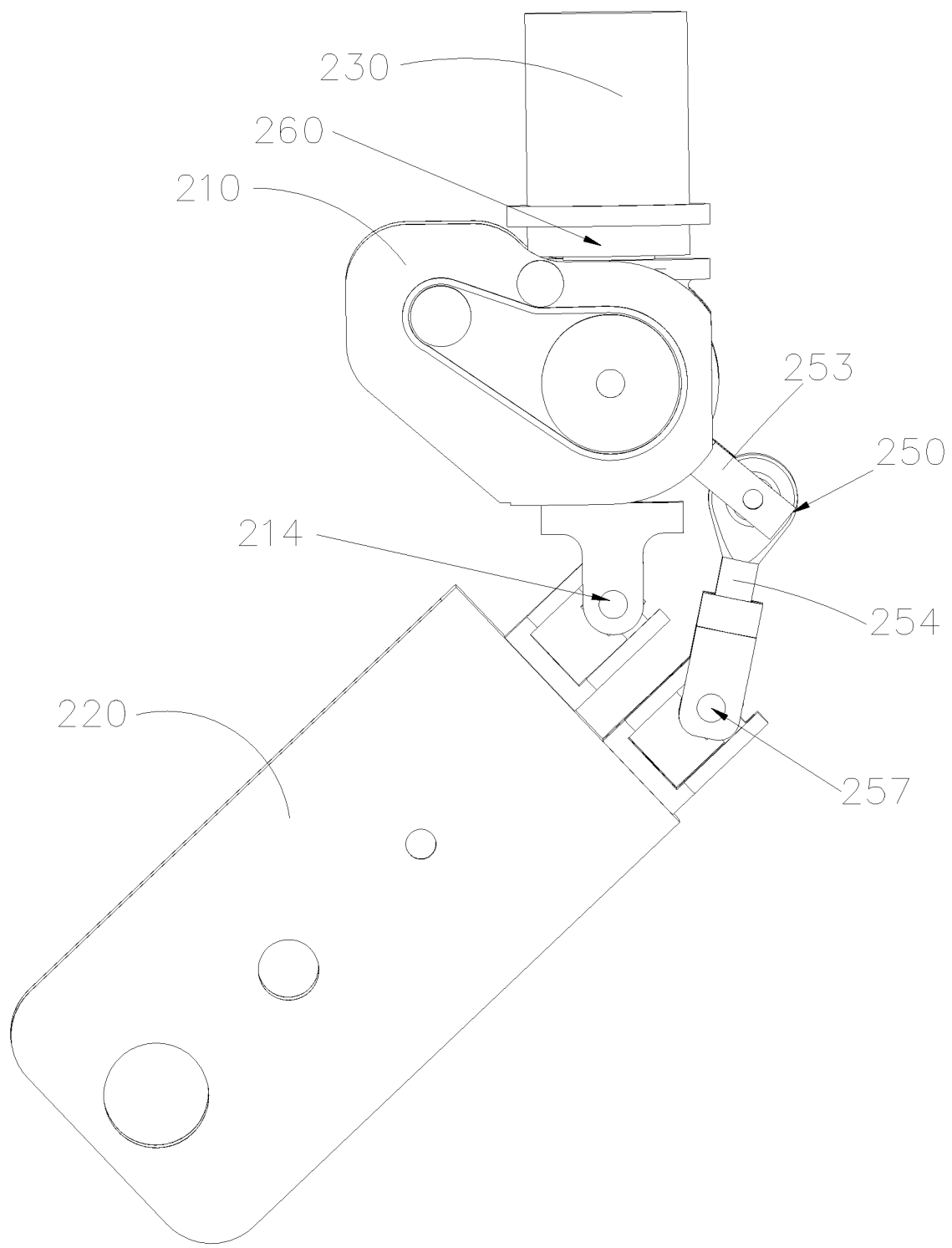
FIG. 7 is a side view of the hip joint mechanism of FIG. 1, showing the upper leg rotating back.
Figure 8:
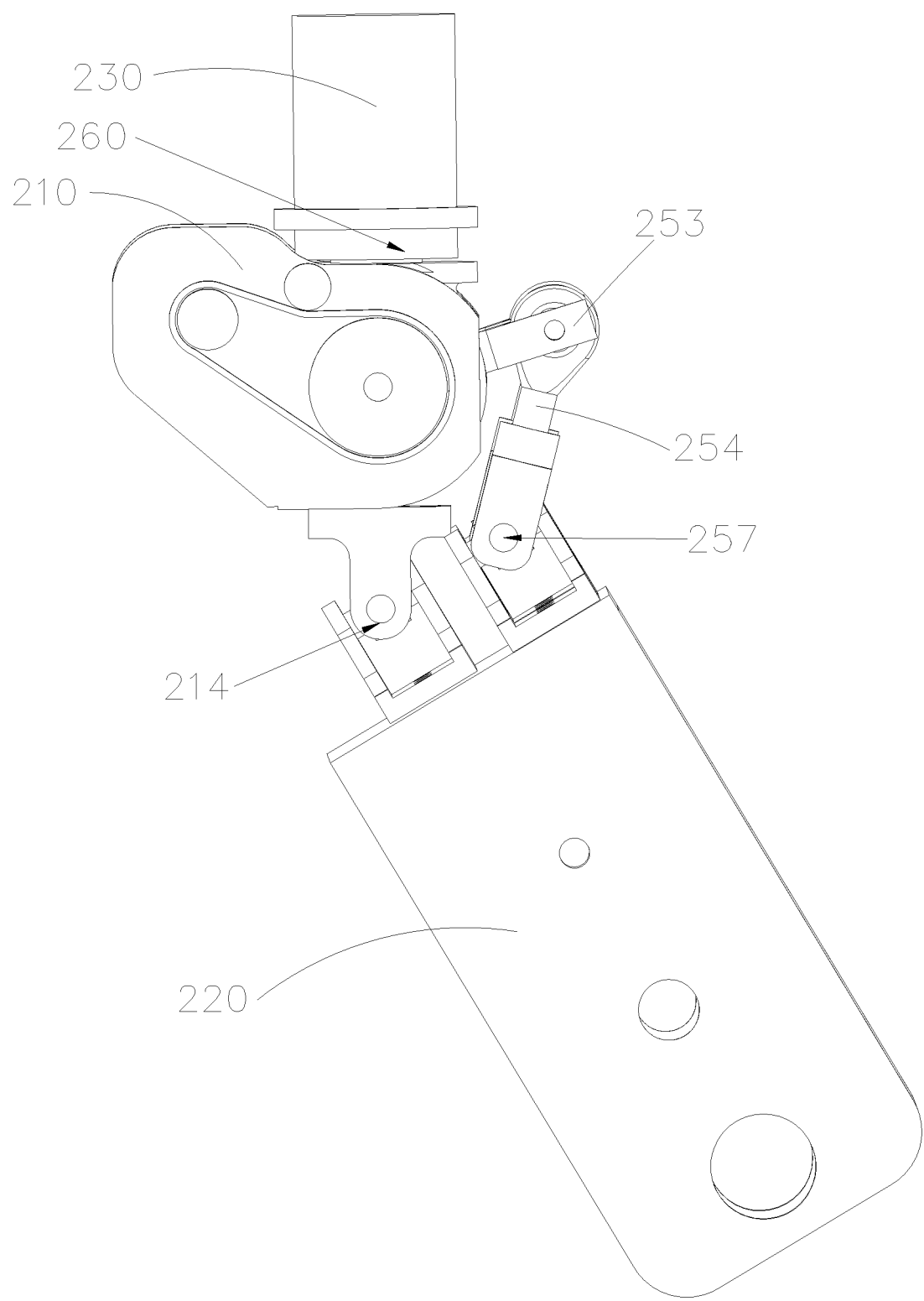
FIG. 8 is similar to FIG. 6, but showing the upper leg rotating forth.
Figure 9:
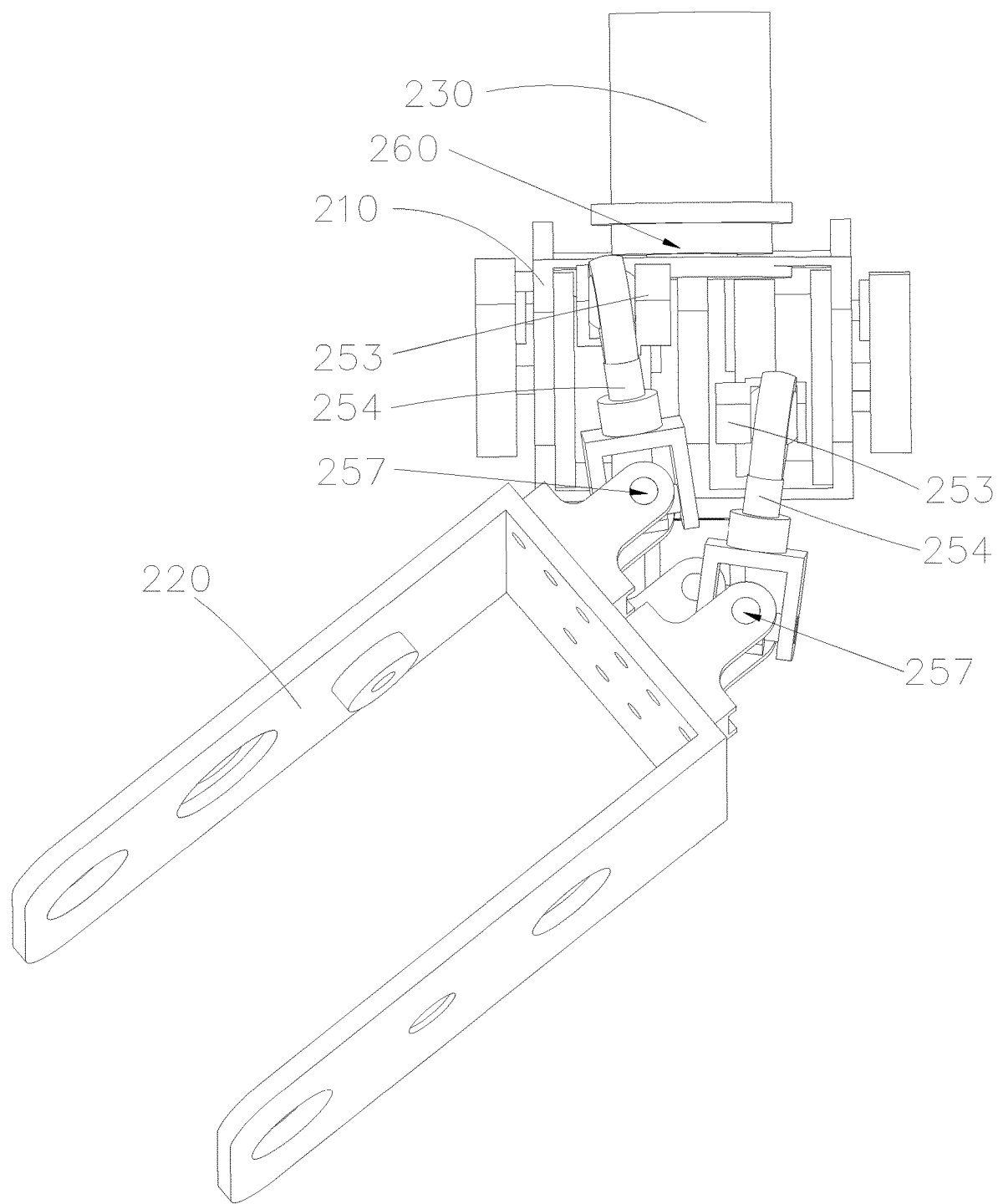
FIG. 9 is a front view of the hip joint mechanism of FIG. 1, showing the upper leg rotating back/forth while performing abduction movement.

In one embodiment, the connecting mechanism between the upper leg 220 and the hip joint frame 210 is located at the rear of the upper leg 220, and the connecting mechanisms between the output ends of the two transmission mechanisms 250 and the upper leg 220 are located at the front of the upper leg 220. Referring to FIGS. 3, 7, and 8, when the output ends 2501 of the two transmission mechanisms 250 move in the same direction, the pitching movement of the hip joint is realized. That is, the upper leg 220 rotates back/forth with respect to the hip joint frame 210. Referring to FIG. 9, when the output ends of the two transmission mechanisms 250 respectively move up and down, a combined movement of the hip joint including rolling movement and pitching movement is realized. That is, the upper leg 220 rotates back/forth while performing adduction/adduction movement.

Referring to FIGS. 1, 2, 4 and 6, in one embodiment, the two upper leg actuators 240 are rotating actuators such as rotating motors. Each of the two transmission mechanisms 250 includes a transmission shaft 251 connected to the hip joint frame 210, a transmission assembly 252 configured to transmit motion from one corresponding upper leg actuator 240 to the transmission shaft 251, a transmission link 253 that is driven by the transmission shaft 251, and link shaft 254 having opposite ends that are rotatably connected to the transmission link 253 and the upper leg 220. With this arrangement, mechanical power can be transmitted from the upper leg actuators 240 to the upper leg 220 and the posture of the upper leg 220 can be adjusted. During operation, mechanical power can be transmitted from the upper leg actuators 240 to the transmission shaft 251 through the transmission assembly 252, and the transmission shaft 251 can drive the transmission link 253 to rotate. The hip joint frame 210, the transmission link 253, the link shaft 254 and the upper leg 220 form a link mechanism, and the link shaft 254 can drive the upper leg 220 to move.

The rear portion of the hip joint frame 210 is hinged to the upper leg 220 and cooperates with the two upper leg actuators 240 and the transmission mechanisms 250, which allows the upper leg 30 to be adjusted in the three connecting mechanisms, thereby realizing the pitching movement and rolling movement of the hip joint. Referring to FIGS. 7 and 8, when the two transmission links 253 rotate in the same direction, the pitching movement of the hip joint is realized. Referring to FIG. 9, when the two transmission links 253 rotate in different directions, a combined movement of the hip joint including rolling movement and pitching movement is realized. Referring to FIGS. 1 and 3, when the upper leg 220 is in a vertical state, the two link shafts 254 extend in the vertical direction, and the transmission links 253 extend toward the front of the robot to reliably support the hip joint frame 210 and associated components.

The upper leg actuators 240 can be motors. The upper leg actuators 240 are fixed to the hip joint frame 210, and the cables extending out of the upper leg actuators 240 can be attached to the hip joint frame 210 to avoid the difficulty of wiring and the wear of the cables due to the relative rotation of joints of the robot. Specifically, two upper leg actuators 240 are coaxially arranged and fixed to the hip joint frame 210, and respectively cooperate with the transmission mechanisms 250 to apply forces to the upper leg 220 at two different positions, thereby adjusting the posture of the upper leg 220.

Referring to FIGS. 1 and 2, in one embodiment, the transmission assembly 252 includes a first wheel 2521 fixed to the output shaft 2402 of one corresponding upper leg actuator 240, a second wheel 2522 coaxially fixed to the transmission shaft 251, and a belt 2523 arranged around the first wheel 2521 and the second wheel 2522. The belt mechanism can transmit the mechanical power from the upper leg actuators 240 to the transmission shafts 251 to rotate the transmission shafts 251. In addition, the hip joint frame 210 is also provided with a tensioning wheel 2524 pressing against the belt 2523, so that the belt mechanism works reliably.

In another embodiment, the transmission assembly 252 may be a chain transmission mechanism. In this way, the mechanical power from the upper leg actuators 240 can be transmitted to the transmission shafts 251 to rotate the transmission shafts 251.

Figure 4:
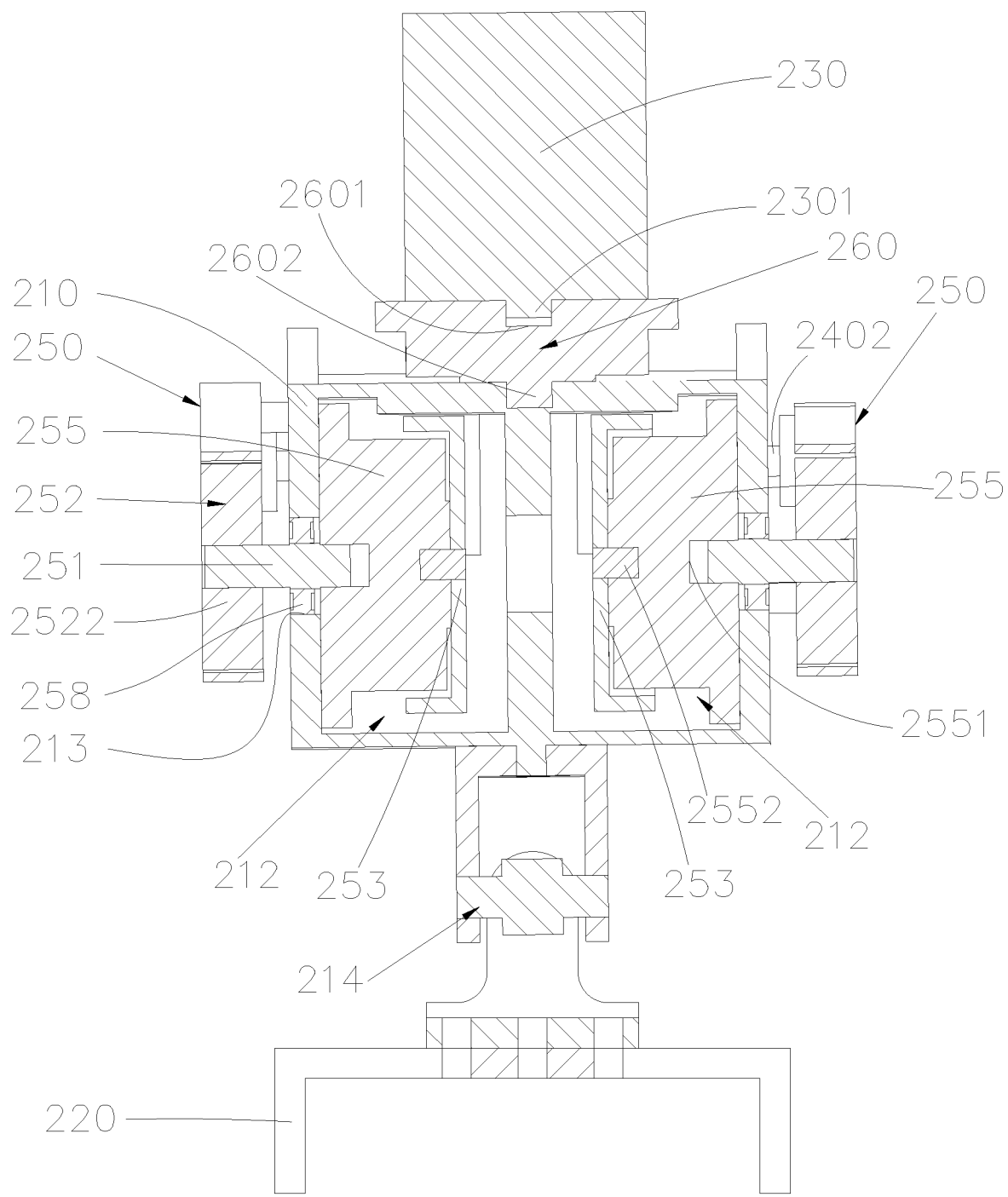
FIG. 4 is a cross-sectional view of the hip joint mechanism, taken along lines A-A of FIG. 3.
Figure 6:
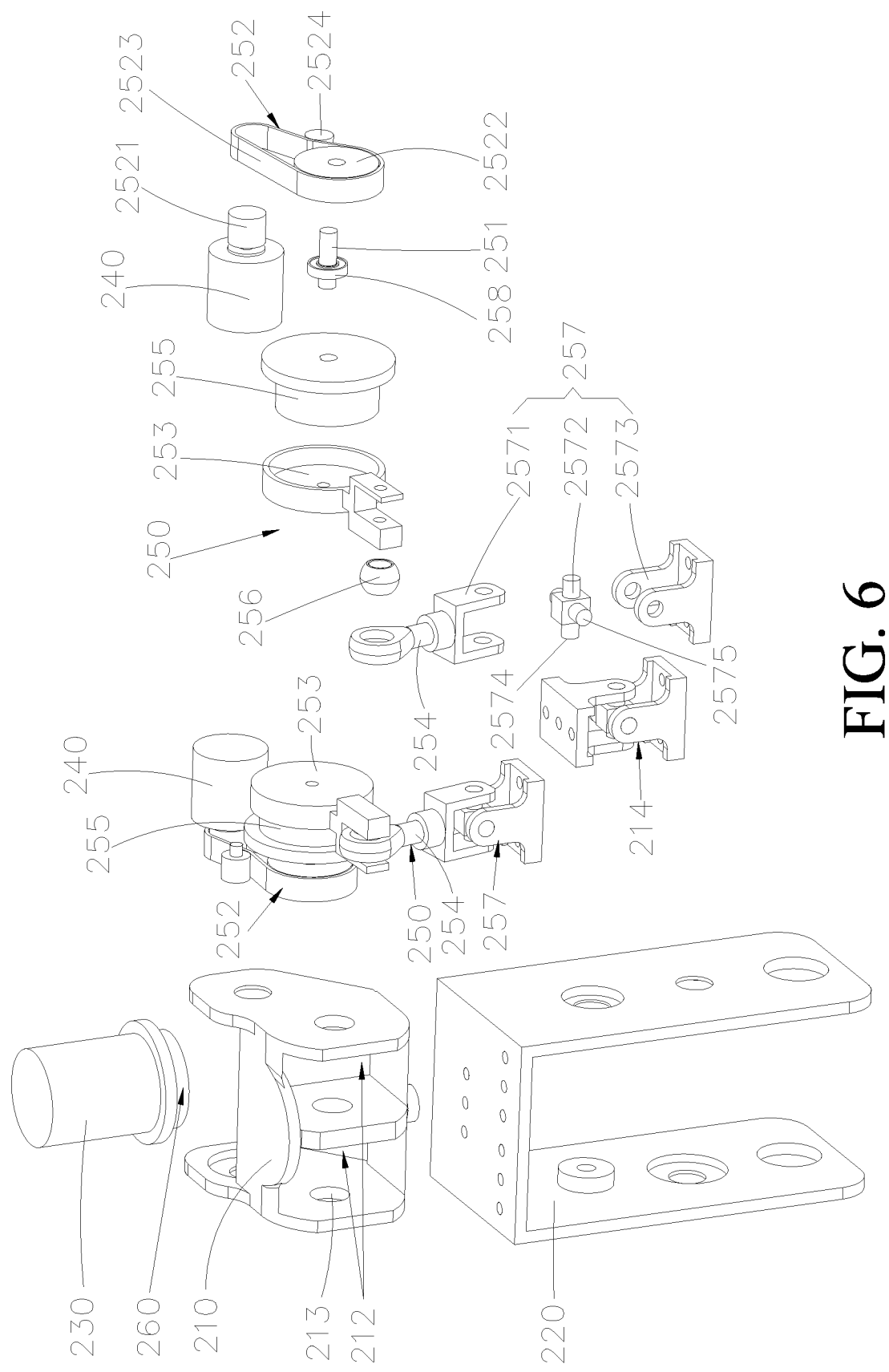
FIG. 6 is another isometric exploded view of the hip joint mechanism.

Referring to FIGS. 4 and 6, in one embodiment, the hip joint mechanism further includes two speed reducers 255 between the transmission shafts 251 and the transmission links 253. Each speed reducer 255 includes an input shaft 2551 connected to one corresponding transmission shaft 251 and an output shaft 2552 connected to one corresponding transmission link 253. The speed reducers 255 are provided to reduce the speed to increase the torque, so that the transmission links 253 can output a predetermined mechanical power, and then drives the link shafts 254 and the upper leg 220 to move. The speed reducers can be harmonic reducers, RV reducers, planetary reducers, and the like.

Figure 5:
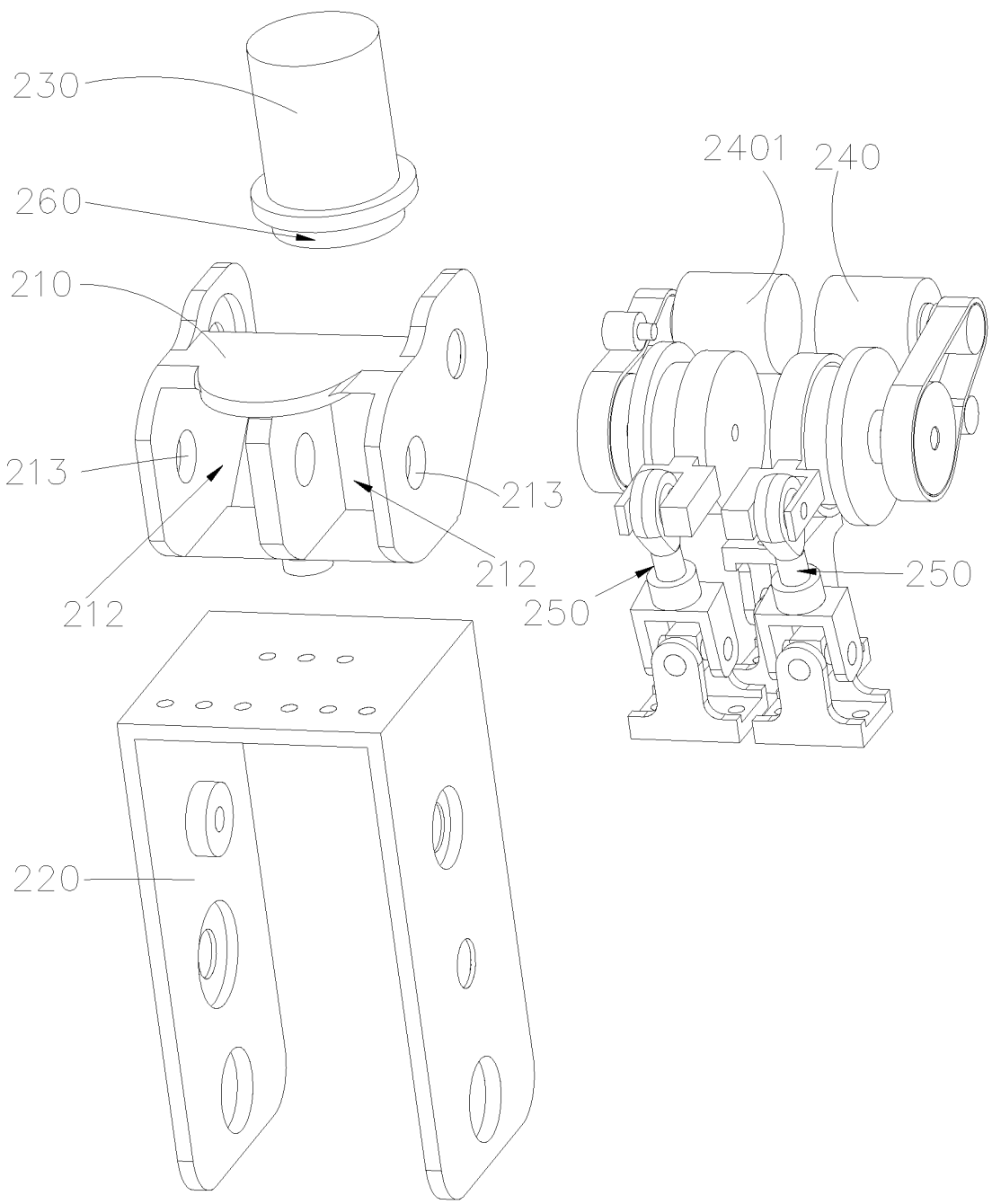
FIG. 5 is an isometric exploded view of the hip joint mechanism.

Referring to FIGS. 1 and 5, in one embodiment, the two upper leg actuators are 240 arranged within the hip joint frame 210. Distal ends of the output shafts 2402 of the upper leg actuators 240 extend to an outside of the hip joint frame 210. The transmission assemblies 252 are arranged outside of the hip joint frame 210. With such configuration, the structure is simple, the overall structure is compact, and the upper leg actuators 240 can be protected.

Referring to FIGS. 4-6, in one embodiment, the hip joint frame 210 defines two chambers 212 to respective receive the two speed reducers 255. The output shafts 2552 of the two speed reducers 255 are coaxially arranged. With such configuration, it is convenient to transmit the mechanical power from the upper leg actuators 240 to the transmission links 253 and the link shafts 254 through the speed reducers 255, so as to rotate the upper leg 220.

In one embodiment, the hip joint frame 210 defines two through holes 213 in communication with the two chambers 212. The two transmission shafts 251 pass through the tow through holes 213 to be connected to the input shafts 2551 of the two speed reducers 255. With such configuration, it is convenient for the transmission shafts 251 to transmit mechanical power to the speed reducers 255, and the transmission shafts 251 can be easily assembled to the speed reducers 255. The through holes 213 of the hip joint frame 210 are provided with supporting bearings 258 for supporting the transmission shafts 251, so that the transmission shafts 251 can rotate freely and stably to transmit mechanical power.

Referring to FIGS. 1 and 6, in one embodiment, each of the link shafts 254 is connected to one transmission link 253 through an articulated bearing 256. The articulated bearings 256 are spherical plain bearings that have an inner ring with a sphere that is convex on its outside and an inner ring with a concave sphere on its inside. The articulated bearings 53 allow for not only rotational movement but also oscillating movement. The joint bearing 53 has the characteristics of large load capacity, impact resistance, corrosion resistance, wear resistance, self-aligning, and good lubrication.

Referring to FIGS. 1, 2, and 6, in one embodiment, the link shafts 254 and the upper leg 220 are connected to each other by two connecting mechanisms 257. Each connecting mechanisms 257 includes an upper connecting part 2571, a lower connecting part 2573, and a cross shaft 2572 that has two shafts 2574 and 2575 perpendicular to each other and is connected to the upper connecting part 2571 and the lower connecting part 2573 and allows the upper connecting part 2571 and the lower connecting part 2573 to rotate in different directions about the two shafts 2574 and 2575. The upper connecting parts 2571 are fixed to the output ends 2501, and the lower connecting parts 2573 are fixed to and located on a surface 221 of the upper leg 220. The connecting mechanism 214 has substantially the same configuration as one connecting mechanism 257, and includes an upper connecting part, a lower connecting part, and a cross shaft that has two shafts and perpendicular to each other and is connected to the upper connecting part and the lower connecting part and allows the upper connecting part and the lower connecting part to rotate in different directions about the two shafts.

Figure 14:
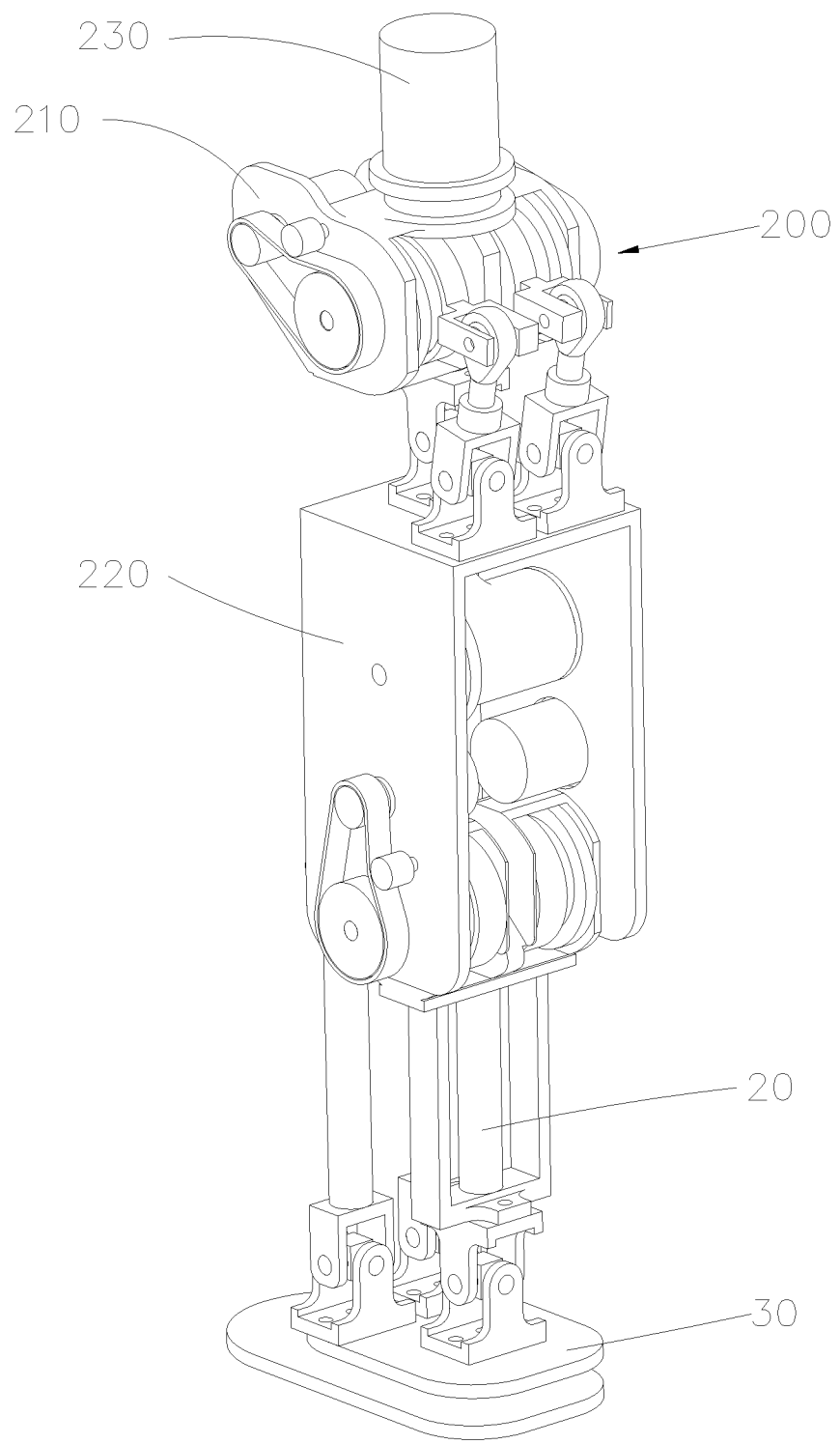
FIG. 14 is an isometric view of a leg mechanism according to embodiment.

Referring to FIGS. 1, 14 and 15, in one embodiment, a humanoid robot includes the hip joint mechanism 200 described above and a waist 300. In the embodiment, the hip joint frame 210 is fixed to the waist 300. The lower end of the upper leg 220 is provided with a lower leg 20, and the lower end of the lower leg 20 is movably provided with a foot 30. The hip joint frame 210, the upper leg 220, the lower leg 20 and the foot 30 are assembled to form a leg of the robot. Compared with some conventional humanoid robots, the heavy hip actuator 230 and the at least one upper leg actuator 240 are mounted to the hip joint frame 210. The hip joint frame 210 is driven to rotate by the hip actuator 230. The at least one transmission mechanism 250 transmits the mechanical power from the hip at least one upper leg actuator 240 to the upper leg 220 to move the upper leg 220, which reduces the weight and moment of inertia of the overall structure, raises the center of gravity of the robot, and reduces the mechanical power required by the hip joint.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A hip joint mechanism comprising:
   a hip joint frame;
   an upper leg movably connected to the hip joint frame;
   a hip actuator configured to drive the hip joint frame to rotate;
   two upper leg actuators mounted on the hip joint frame;
   two transmission mechanisms configured to transmit motion from the two upper leg actuators to the upper leg, wherein each of the upper leg actuators comprises a casing connected to the hip joint frame, and an output shaft connected to one corresponding transmission mechanism, each of the two transmission mechanisms comprises an output end; and
   three connecting mechanisms, wherein the output ends and the hip joint frame are movably connected to the upper leg through the three connecting mechanisms, the three connecting mechanisms are arranged at three vertices of a triangle; each of the three connecting mechanisms comprises a lower connecting part, and the lower connecting parts are fixed to and located on a surface of the upper leg;
   wherein the two upper leg actuators are rotating motors, each of the two transmission mechanisms comprises a transmission shaft connected to the hip joint frame, a transmission assembly configured to transmit motion from one corresponding upper leg actuator to the transmission shaft, a transmission link that is driven by the transmission shaft, and link shaft that is rotatably connected to the transmission link and the upper leg.

2. The hip joint mechanism according to claim 1, wherein the hip actuator is mounted on an outside of the hip joint frame.

3. The hip joint mechanism according to claim 1 further comprising a speed reducer, wherein the hip actuator is a rotating motor and comprises an output shaft, the speed reducer comprises an input shaft connected to the output shaft of the hip actuator, and an output shaft fixed to the hip joint frame.

4. The hip joint mechanism according to claim 1, wherein each of the connecting mechanisms comprises an upper connecting part and a cross shaft that is connected to the upper connecting part and the lower connecting part and allows the upper connecting part and the lower connecting part to rotate in different directions, the upper connecting parts are fixed to the output ends and the hip joint frame.

5. The hip joint mechanism according to claim 1, wherein the transmission assembly comprises a first wheel fixed to an output shaft of one corresponding upper leg actuator, a second wheel coaxially fixed to the transmission shaft, and a belt arranged around the first wheel and the second wheel.

6. The hip joint mechanism according to claim 1 further comprising two speed reducers, wherein each of the two speed reducers comprises an input shaft connected to one corresponding transmission shaft and an output shaft connected to one corresponding transmission link.

7. The hip joint mechanism according to claim 6, wherein the two upper leg actuators are arranged within the hip joint frame, distal ends of the output shafts of the upper leg actuators extend to an outside of the hip joint frame, the transmission assemblies are arranged outside of the hip joint frame; the hip joint frame defines two chambers to respective receive the two speed reducers; the hip joint frame defines two through holes in communication with the two chambers, the two transmission shafts pass through the tow through holes to be connected to the input shafts of the two speed reducers.

8. The hip joint mechanism according to claim 1, wherein each of the link shafts is connected to one transmission link through an articulated bearing.

9. A humanoid robot comprising:
a hip joint mechanism comprising:
a hip joint frame;
an upper leg movably connected to the hip joint frame;
a hip actuator configured to drive the hip joint frame to rotate;
two upper leg actuators mounted on the hip joint frame; and
two transmission mechanisms configured to transmit motion from the two upper leg actuators to the upper leg, wherein each of the upper leg actuators comprises a casing connected to the hip joint frame, and an output shaft connected to one corresponding transmission mechanism, each of the two transmission mechanisms comprises an output end; and
three connecting mechanisms, wherein the output ends and the hip joint frame are movably connected to the upper leg through the three connecting mechanisms, the three connecting mechanisms are arranged at three vertices of a triangle; each of the three connecting mechanisms comprises a lower connecting part, and the lower connecting parts are fixed to and located on a surface of the upper leg;
wherein the two upper leg actuators are rotating motors, each of the two transmission mechanisms comprises a transmission shaft connected to the hip joint frame, a transmission assembly configured to transmit motion from one corresponding upper leg actuator to the transmission shaft, a transmission link that is driven by the transmission shaft, and link shaft that is rotatably connected to the transmission link and the upper leg.

10. The robot according to claim 9, wherein the hip actuator is mounted on an outside of the hip joint frame.

11. The robot according to claim 9 further comprising a speed reducer, wherein the hip actuator is a rotating motor and comprises an output shaft, the speed reducer comprises an input shaft connected to the output shaft of the hip actuator, and an output shaft fixed to the hip joint frame.

12. The robot according to claim 9, wherein each of the connecting mechanisms comprises an upper connecting part and a cross shaft that is connected to the upper connecting part and the lower connecting part and allows the upper connecting part and the lower connecting part to rotate in different directions, the upper connecting parts are fixed to the output ends and the hip joint frame.

13. The robot according to claim 9, wherein the transmission assembly comprises a first wheel fixed to an output shaft of one corresponding upper leg actuator, a second wheel coaxially fixed to the transmission shaft, and a belt arranged around the first wheel and the second wheel.

14. The robot according to claim 9 further comprising two speed reducers, wherein each of the two speed reducers comprises an input shaft connected to one corresponding transmission shaft and an output shaft connected to one corresponding transmission link.

15. The robot according to claim 14, wherein the two upper leg actuators are arranged within the hip joint frame, distal ends of the output shafts of the upper leg actuators extend to an outside of the hip joint frame, the transmission assemblies are arranged outside of the hip joint frame; the hip joint frame defines two chambers to respective receive the two speed reducers; the hip joint frame defines two through holes in communication with the two chambers, the two transmission shafts pass through the tow through holes to be connected to the input shafts of the two speed reducers.

16. The robot according to claim 9, wherein each of the link shafts is connected to one transmission link through an articulated bearing.

* * * * *